Patented July 6, 1926.

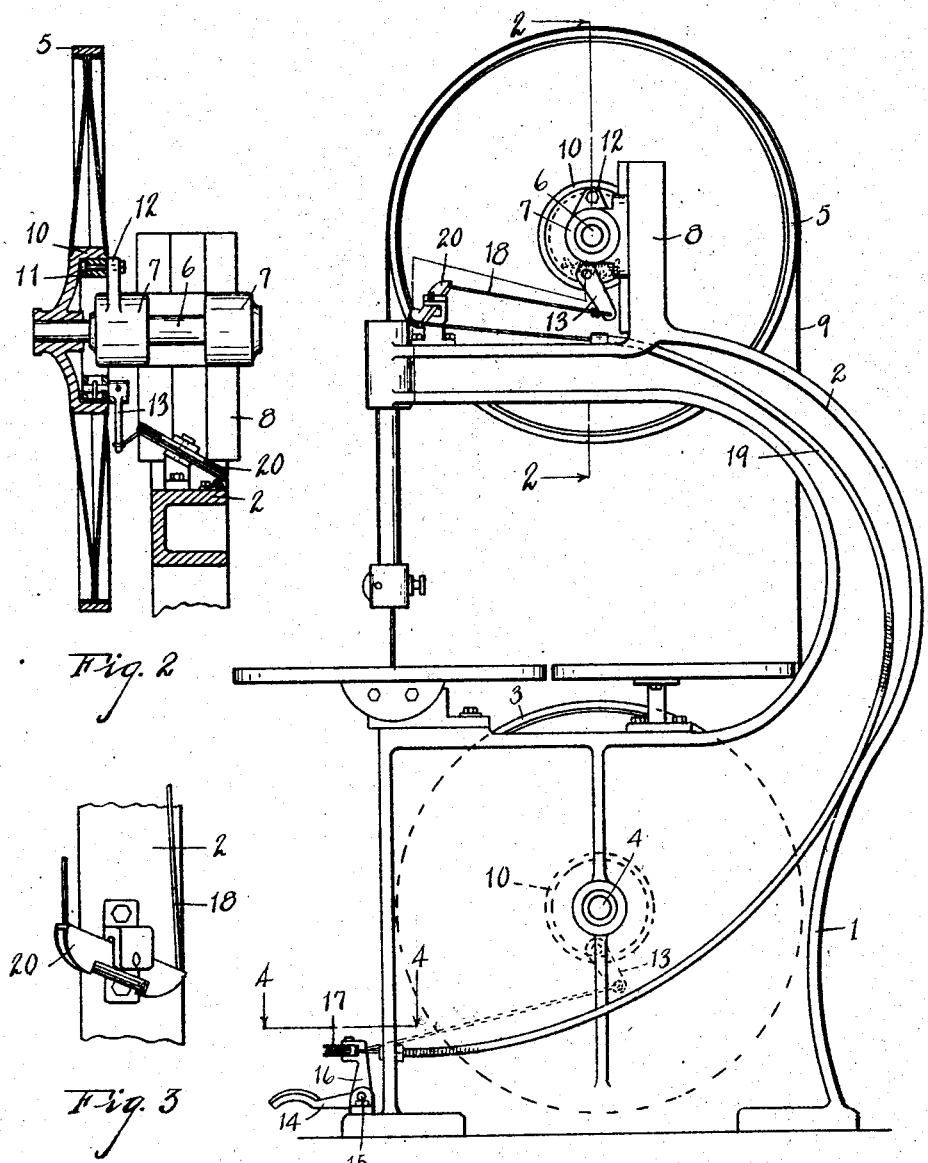

1,591,247

UNITED STATES PATENT OFFICE.

CARL E. TANNEWITZ, OF GRAND RAPIDS, MICHIGAN.

BAND SAW.

Application filed January 19, 1926. Serial No. 82,207.

The main object of this invention is to provide in a band saw an improved brake mechanism whereby the strain upon the band saw in braking or checking the machine is minimized permitting the quick stopping of the machine.

A further object is to provide a mechanism having these advantages which is very simple and durable in structure and easy to operate.

Objects pertaining to details and economies of my invention will definitely appear from the detailed description to follow. The invention is clearly defined and pointed out in the claims.

A structure embodying the features of my invention is clearly illustrated in the accompanying drawing forming a part of this application, in which:

Fig. 1 is a side elevation of a sawing machine of the band saw type embodying my invention.

Fig. 2 is a fragmentary view partially in section on a line corresponding to line 2—2 of Fig. 1.

Fig. 3 is a fragmentary plan view showing details of the operating connections.

Fig. 4 is a detail section on a line corresponding to line 4—4 of Fig. 1.

In the drawing 1 represents the frame of the machine which is provided with an overhanging standard 2 on which the upper wheel of the machine is mounted. The lower wheel 3 is mounted on the spindle 4. The driving means for this spindle is not illustrated.

The upper wheel 5 is carried by the spindle 6, the bearings 7 of which are mounted for vertical adjustment on the bracket 8. The saw is conventionally shown at 9.

Each band wheel is provided with a hub 10 constituting the drum of a brake mechanism, the brake shoe 11 being mounted on the arm 12 of one of the bearings 7. Each brake mechanism is provided with an actuating lever 13.

These brake mechanisms are connected for simultaneous operation by means of the foot lever 14 which is pivoted at 15 and has an upwardly projecting arm 16 carrying the equalizing bar 17. The wire cable 18 is arranged over this equalizing bar, one end of the cable being connected to the lever 13 of the lower band wheel brake mechanism and the other being disposed through a guiding and supporting tube 19 and passed over the guide lever or equalizing bar 20 from whence it passes to the brake lever 13 of the upper brake mechanism.

Thus arranged, when the foot lever is actuated the brakes are simultaneously applied to the band wheels, thus relieving the saw of any strains as is the case where the braking is on one wheel only. This greatly reduces breakage and greatly increases the life of the band saws, as well as eliminating danger to the operator from unexpected breaking of the saws.

I have illustrated and described my improvements in an embodiment which has proven highly satisfactory. I have not attempted to illustrate or describe other embodiments or adaptations as I believe the disclosure made will enable those skilled in the art to embody or adapt my improvement as may be desired.

Having thus described my invention what I claim as new and desire to secure by Letters Patent is:

1. In a band saw, the combination with a supporting frame and a band saw, of a pair of saw carrying and driving wheels mounted on said frame, an independent brake mechanism for each wheel provided with a brake lever, an actuating lever, an equalizer bar on said actuating lever, and operating connections for said actuating lever to said brake levers comprising a wire cable connected at its ends to said brake levers and engaged over said equalizer bar, there being a guide lever adjacent the upper brake lever and over which the cable is arranged, and a guiding and supporting tube for the cable disposed between said guide lever and equalizer bar.

2. In a band saw, the combination with a supporting frame and a band saw, of a pair of saw carrying and driving wheels mounted on said frame, an independent brake mechanism for each wheel provided with a brake lever, an actuating lever, an equalizer bar on said actuating lever, and operating connections for said actuating lever to said brake levers.

3. In a band saw, the combination with a band saw, of a pair of supporting and driving wheels, each wheel being provided with a brake mechanism, a foot lever, an equalizing bar on said foot lever, and operating connections for said equalizer bar to the brake mechanisms.

4. In a band saw, the combination with a band saw, of the saw supporting and driving wheels, each provided with an independent brake mechanism, and a common actuating means for each brake mechanism whereby they may be simultaneously engaged.

5. In a band saw, the combination with a band saw, of saw supporting and driving wheels, each provided with independent brake means, and means for simultaneously actuating said brake means.

In witness whereof I have hereunto set my hand.

CARL E. TANNEWITZ.